(12) United States Patent
Kaste et al.

(10) Patent No.: US 12,509,113 B2
(45) Date of Patent: Dec. 30, 2025

(54) SEGMENT-BASED DRIVER ANALYSIS AND INDIVIDUALIZED DRIVER ASSISTANCE

(71) Applicant: Volkswagen Aktiengesellschaft, Wolfsburg (DE)

(72) Inventors: Jonas Kaste, Alfeld (DE); Maximilian Templer, Braunschweig (DE); Sevsel Gamze Kabil, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 197 days.

(21) Appl. No.: 18/550,962

(22) PCT Filed: Mar. 18, 2022

(86) PCT No.: PCT/EP2022/057188
§ 371 (c)(1),
(2) Date: Sep. 16, 2023

(87) PCT Pub. No.: WO2022/200217
PCT Pub. Date: Sep. 29, 2022

(65) Prior Publication Data
US 2024/0140481 A1    May 2, 2024

(30) Foreign Application Priority Data
Mar. 26, 2021    (DE) .................... 10 2021 203 057.2

(51) Int. Cl.
*B60W 60/00*    (2020.01)
(52) U.S. Cl.
CPC ....... *B60W 60/001* (2020.02); *B60W 2520/10* (2013.01); *B60W 2520/105* (2013.01);
(Continued)

(58) Field of Classification Search
CPC .......... B60W 60/001; B60W 2520/10; B60W 2520/105; B60W 2552/10;
(Continued)

(56) References Cited

U.S. PATENT DOCUMENTS 5,948,042 A * 9/1999 Heimann ........... G01C 21/3815
701/117
11,143,513 B2 * 10/2021 Jiang .................... G08G 1/0129
(Continued)

FOREIGN PATENT DOCUMENTS

CN          103496368 B  *  4/2016    ............ B60W 30/14
CN          107953888 A  *  4/2018    ............ B60W 40/06
(Continued)

OTHER PUBLICATIONS

CN_103496368_B_I_translation (Year: 2016).*
(Continued)

*Primary Examiner* — Kyle T Johnson
(74) *Attorney, Agent, or Firm* — Peter Zura; LOZA & LOZA, LLP

(57) ABSTRACT

Technologies and techniques for controlling a vehicle, in which geometric test data and driving dynamics test data are obtained on a test track. The test data are divided into clusters, and cluster-specific drive-dynamic data is defined for each cluster. Subsequently, the route to be driven is clustered and the vehicle is controlled in a route section in accordance with the specified drive-dynamic data of the respective cluster. Under such configurations, it may be ensured that the driver is supported as individually as possible when driving on unknown routes.

20 Claims, 3 Drawing Sheets

(52) U.S. Cl.
CPC ..... *B60W 2552/10* (2020.02); *B60W 2552/30* (2020.02); *B60W 2554/406* (2020.02); *B60W 2555/20* (2020.02)

(58) Field of Classification Search
CPC ....... B60W 2552/30; B60W 2554/406; B60W 2555/20; B60W 50/085; B60W 2552/05; B60W 2555/60; B60W 30/025; B60W 40/105; B60W 40/107; B60W 40/109; B60W 40/114; B60W 2050/0063; B60W 2050/0095; B60W 40/09
See application file for complete search history.

(56) References Cited

U.S. PATENT DOCUMENTS

| | | | | |
|---|---|---|---|---|
| 2010/0023223 | A1* | 1/2010 | Huang | B60W 40/09 340/576 |
| 2016/0026182 | A1* | 1/2016 | Boroditsky | B60K 31/00 701/23 |
| 2017/0097243 | A1* | 4/2017 | Ricci | G08G 1/0968 |
| 2017/0148350 | A1* | 5/2017 | Stankoulov | G09B 19/167 |
| 2018/0105186 | A1* | 4/2018 | Motomura | B60K 35/00 |
| 2018/0211544 | A1* | 7/2018 | Smartt | H04W 4/46 |
| 2018/0238702 | A1* | 8/2018 | Liebinger | G01C 21/3461 |
| 2019/0265703 | A1* | 8/2019 | Hicok | G06Q 10/02 |
| 2019/0283745 | A1* | 9/2019 | Nagel | G08G 1/0112 |
| 2019/0344804 | A1* | 11/2019 | Motomura | B60W 40/10 |
| 2020/0023835 | A1* | 1/2020 | Hardå | G06N 3/08 |
| 2020/0156639 | A1 | 5/2020 | Liu et al. | |
| 2020/0192403 | A1* | 6/2020 | Silver | B60W 10/18 |
| 2021/0012590 | A1 | 1/2021 | Lawrie-Fussey et al. | |
| 2021/0070308 | A1* | 3/2021 | Kim | B60W 60/0053 |
| 2021/0213959 | A1* | 7/2021 | Shahriari | G05D 1/0088 |
| 2022/0024474 | A1* | 1/2022 | Kaste | B60W 50/06 |
| 2022/0065639 | A1* | 3/2022 | Mistele | G01C 21/3446 |
| 2022/0082705 | A1* | 3/2022 | Graves | G01S 19/50 |
| 2022/0153287 | A1* | 5/2022 | Stählin | B60W 50/045 |
| 2023/0227066 | A1* | 7/2023 | Templer | B60W 60/001 701/23 |
| 2023/0343153 | A1* | 10/2023 | Schlömicher | G06F 11/3684 |
| 2024/0017744 | A1* | 1/2024 | Zuo | B60W 60/00182 |
| 2024/0140481 | A1* | 5/2024 | Kaste | B60W 30/025 |
| 2024/0174242 | A1* | 5/2024 | Schaaf | B60W 50/0205 |
| 2025/0315050 | A1* | 10/2025 | Van Hout | G05D 1/227 |

FOREIGN PATENT DOCUMENTS

| | | | | |
|---|---|---|---|---|
| CN | 109367541 | A | | 2/2019 |
| CN | 109476337 | A * | 3/2019 | ............ B60K 35/00 |
| CN | 110329271 | B | | 1/2021 |
| CN | 112373482 | B * | 11/2021 | ............ G06F 30/20 |
| CN | 118770247 | A * | 10/2024 | ......... B60W 40/105 |
| DE | 102009034096 | A1 | | 9/2010 |
| DE | 102014210539 | A1 * | 12/2015 | ............ B60W 40/02 |
| DE | 102016117136 | A1 | | 3/2018 |
| DE | 102016216335 | A1 | | 3/2018 |
| DE | 102018001634 | A1 | | 8/2018 |
| DE | 102017209258 | A1 | | 12/2018 |
| DE | 102019205892 | A1 | | 10/2020 |
| DE | 102019219534 | A1 | | 6/2021 |
| DE | 102022119715 | B4 * | 1/2025 | ......... B60W 50/045 |
| EP | 3272611 | A1 | | 1/2018 |
| WO | WO-2014135487 | A1 * | 9/2014 | ......... B60W 30/095 |
| WO | 2016109540 | A1 | | 7/2016 |
| WO | 2019134110 | A1 | | 7/2019 |

OTHER PUBLICATIONS

CN_107953888_A_I_translation (Year: 2018).*
CN_109476337_A_I_translation (Year: 2019).*
DE_102014210539_A1_I_translation (Year: 2015).*
DE_102022119715_B4_I_translation (Year: 2025).*
WO_2014135487_A1_I_translation (Year: 2014).*
CN-118770247-A translation (Year: 2024).*
CN-112373482-B translation (Year: 2021).*
PCT/EP2022/057188. International Search Report (Jul. 6, 2022).
Priority German Application No. 102021203057.2 Examination Report (Aug. 17, 2021).

* cited by examiner

SEGMENT-BASED DRIVER ANALYSIS AND INDIVIDUALIZED DRIVER ASSISTANCE

RELATED APPLICATIONS

The present application claims priority to International Patent Application No. PCT/EP2022/057188 to Kaste et al., filed Mar. 18, 2022, titled "Segment-Based Driver Analysis And Individualized Driver Assistance," which claims priority to German Pat. App. No. 10 2021 203 057.2 filed Mar. 26, 2021, to Kaste et al., the contents of each being incorporated by reference in their entirety herein.

TECHNICAL FIELD

The present disclosure relates to technologies and techniques for controlling a vehicle on a route to be driven. In addition, the present disclosure relates to a corresponding driver assistance system and a motor vehicle employing such technologies and techniques.

BACKGROUND

Driver assistance systems and driving functions are usually not very individualized, and therefore offer the driver little scope for an emotional driving experience or generate little acceptance due to incomprehensible interventions. Individual driver assistance systems, on the other hand, enable improved customer acceptance and the associated added value or increased motivation to configure the vehicle accordingly.

A driving dynamics analysis of the driving behavior and driving skills of a driver is usually done with known methods by assigning the driver to individual categories, such as "sporty", "cautious", etc. This assignment can be done, for example, in the form of GG diagrams (acceleration diagrams) in which the longitudinal and lateral acceleration are plotted two-dimensionally. This is used to generate a rough description of the driving behavior limits or driving ability, but detailed preferences in driving the vehicle cannot be taken into account in this way.

Document US 2021/0012590 A1 discloses a monitoring device for providing vehicle telemetry data. The monitoring device comprises a sensor for detecting vibrations caused by vehicle and engine movements in vehicle parts to generate corresponding vibration data. Characteristics for the vehicle or engine can be extracted from the vibration data.

In addition, publication WO 2019/134110 A1 discloses a method and a system for autonomous driving. A driving situation map is generated from sensor data. A deep learning algorithm is trained to generate a driving command based on the driving situation map.

Publication DE 10 2017 209 258 A1 discloses a method and a device for monitoring the driving stability of a vehicle on an upcoming route. A current speed, current steering angle and current position of the vehicle are determined. A driver type is also identified. A speed signal and a steering angle signal are predicted using this data.

Publication US 2016/0026182 A1 discloses personalized driving of autonomous vehicles. For this purpose, at least part of a driving profile is loaded onto a vehicle. The vehicle is controlled based on the driving profile.

BRIEF SUMMARY

Aspects of the present disclosure are directed to a driver assistance system that facilitates more individual support for the driver.

Some aspects are achieved by the subject matter of the independent claims. Other aspects are disclosed from the sub-claims.

In some examples, a method is provided for controlling a vehicle on a route to be driven. Such a method, for example, may be carried out in a driver assistance system. However, the method can also be used to control a vehicle autonomously. In one case, the driver receives individual support tailored to the driver, and in the other case, he is completely relieved of any steering in that the vehicle is individually guided according to the driver's habits.

Initially, a driver drives on a test track to collect data. Of course, this driver can also subsequently drive on other test tracks in order to obtain corresponding test data. The test track or the test tracks should have as many different features as possible so that a wide variety of test data can be obtained.

Geometric test data is collected from the test track. The capturing of the geometric test data can be done via sensor technology in the vehicle. When driving on the test track, these sensors record geometric test data such as lane width or track width, curvature of the track and the like. However, such geometric test data can also be made available, for example, from a database and loaded into the vehicle when convenient. This geometric test data is the basis for classifying routes or route sections to be traveled in the future.

The driving dynamics test data is captured when the driver drives on the test track. Such test data include, for example, accelerations, speeds and the like. The driving dynamics test data is then assigned to the geometric test data to determine the individual driver's behavior, for example, when cornering. The driving dynamics test data is determined and saved by the sensor technology in the vehicle. If necessary, these driving dynamics test data are transmitted together with the geometric test data to a vehicle-external computing unit in order to process them there and to send the suitably processed data back to the vehicle. The driving dynamics test data provide information about the driving behavior of the driver in certain situations or on certain sections of the road.

The captured or partially provided test data, i.e., the geometric test data and possibly further objective situational data, together usually form a scatter-plot in a test data space, which is usually multidimensional. Each parameter of the geometric test data and the further situation data forms its own dimension in the test data space. The test data space or scatter-plot is then divided into clusters. A cluster analysis can be carried out for this purpose to discover similarity structures in the database. The cluster analysis is based on objectifiable variables, such as track width, curvature, pitch, incline, temperature, traffic volume, weather (wet, dry, etc.), substrate (asphalt, cobblestones), planning reference variables (speeds, acceleration, yaw angle, etc.) but not on the basis of a driver's subjective variables. The clustering serves to automatically subdivide driven routes into scenarios/segments. It is intended to serve as a tool to objectively provide areas for extracting the driving style. In this way, the test data space or the test data can be divided into a multitude of clusters, which can serve as a basis for a subsequent classification.

The driving dynamics data for each cluster may be determined on the basis of the driving dynamics test data of the respective cluster in a further step. This means that scenarios in which a driver is highly likely to behave in a reproducible manner are identified using the clustering, and the behavior is determined on this basis, and applied later. For example, the driver drives closer to the outer edge of the road than to the center line when making a left turn on a hard shoulder road. This has been proven, for example, in several test drives. On average, the driver maintains a distance of one meter to the outer edge of the lane in such situations. Therefore, this distance to the outer edge of the lane is defined as a dynamic data set for precisely this cluster. If the vehicle then drives autonomously or assists, the vehicle will try to maintain exactly this individual distance of one meter from the outer edge of the lane when driving through the left curve. As a result, the driver can be supported exactly as he would decide himself.

In a further step, sections of the route to be driven are assigned to the clusters using geometric data of the route to be driven. Thus, a new, unknown route that the driver needs to drive is automatically divided into segments. Each segment, i.e., each route section, is assigned to a cluster. The assignment is performed, among other things, by using geometric data that is available on the route to be traveled and, if necessary, other data that describe the respective scenarios (route width, curvature, inclination, gradient, temperature, traffic volume, weather, substrate, reference variables for planning, etc.). For example, the geometric data were obtained from a navigation system or from a vehicle-external database. The geometric data of the route to be driven, such as the coordinates, the curvature and the width of the route, can be taken into account in order, for example, to assign each point on the route to be driven to a cluster. For example, a centroid method can be used to assign each point on the route to be driven to a respective cluster. In this case, the point is assigned to the cluster to which the point has the smallest distance in the data space. In this way, the entire route to be driven can be subdivided into route sections or segments, each of which is assigned to one of the clusters.

In some examples, at least one vehicle component of the vehicle is controlled in one of the route sections in accordance with the defined driving dynamics data of the respective cluster. At least one vehicle component is therefore controlled accordingly, which means that the driver is either supported or the vehicle is controlled autonomously. Since the route section to be traveled has been clearly classified, i.e. has been assigned to a cluster, precisely those defined driving dynamics data of the respective cluster can be used for control. For example, if the section to be driven falls in the "straight stretch" cluster and the driver always drove such "straight stretches" at a speed of 90 km/h during the test drives, the vehicle is also controlled here with individual driver support in such a way that it drives 90 km/h on the "straight line".

In the past, for example, there was only one type of driving profile selection. With this optional feature, it is always possible to select the right driving profile: e.g., Normal, Economy, Sport, Comfort or Individual. The engine and transmission harmonization and the behavior of certain assistance systems are thus adapted to the circumstances. However, these settings do not learn based on scenarios and do not specifically adapt the support according to the respective driving situation. In addition, no individualized driving styles are taken into account, which, for example, look at the alignment, braking points, etc.

With the unique solutions presented herein, however, it is possible to extract features that describe the scenario-based customer behavior and extract them in a targeted manner and to implement them in an individualized assistance system. This offers the advantage of potentially higher acceptance for the driving dynamics support. Additionally, the function could be offered as an optional feature to an existing function, adding value to the product without significant additional cost.

In some examples, a driver assistance system is disclosed for controlling a vehicle on a route to be driven with a detection device for detecting the geometric test data of the test track and for detecting the driving dynamics test data when a driver drives on a test track, a classification device for splitting a test data space formed by the geometric test data in clusters and a data processing device for determining driving dynamics data for each cluster on the basis of those driving dynamics test data that can be assigned to a respective cluster, the classification device being designed to assign route sections of the route to be driven to the clusters based on geometric data of the route to be driven and the driver assistance system has a control device for controlling at least one vehicle component of the vehicle in one of the route sections according to the defined driving dynamics data of the respective cluster. This means that the clustering is based on objective variables, such as track width, curvature, pitch, incline, temperature, traffic volume, weather (wet, dry, etc.), substrate (asphalt, cobblestones), planning reference variables (speeds, acceleration, yaw angle, etc.), but not on the basis of a driver's subjective values.

Such a driver assistance system therefore has a detection device, which in turn has a corresponding sensor system, for example. In addition, the detection device can also include suitable interfaces for recording test data. The classification device of the driver assistance system can be based on vector machines or neural networks or the like. In any case, the classification device has a processor and corresponding memory components for the automated classification. The data processing device of the driver assistance system is also equipped with a corresponding processor and memory modules. If necessary, the classification device and the data processing device are implemented in one unit. In addition, the driver assistance system has a control device with which vehicle components of the vehicle can be addressed. Appropriate drivers may need to be provided for this purpose.

The driver assistance system is preferably capable of executing the processes described herein and their further developments. This results in the same advantages for the driver assistance system as for the corresponding processes.

In addition, a motor vehicle can be equipped with the driver assistance system mentioned herein. The motor vehicle can thus be controlled or supported individually with the characteristics of a driver.

The present disclosure also includes the combinations of features of the described embodiments.

BRIEF DESCRIPTION OF THE DRAWINGS

Exemplary embodiments are described below. The following figures show.

DETAILED DESCRIPTION

Figure 1:
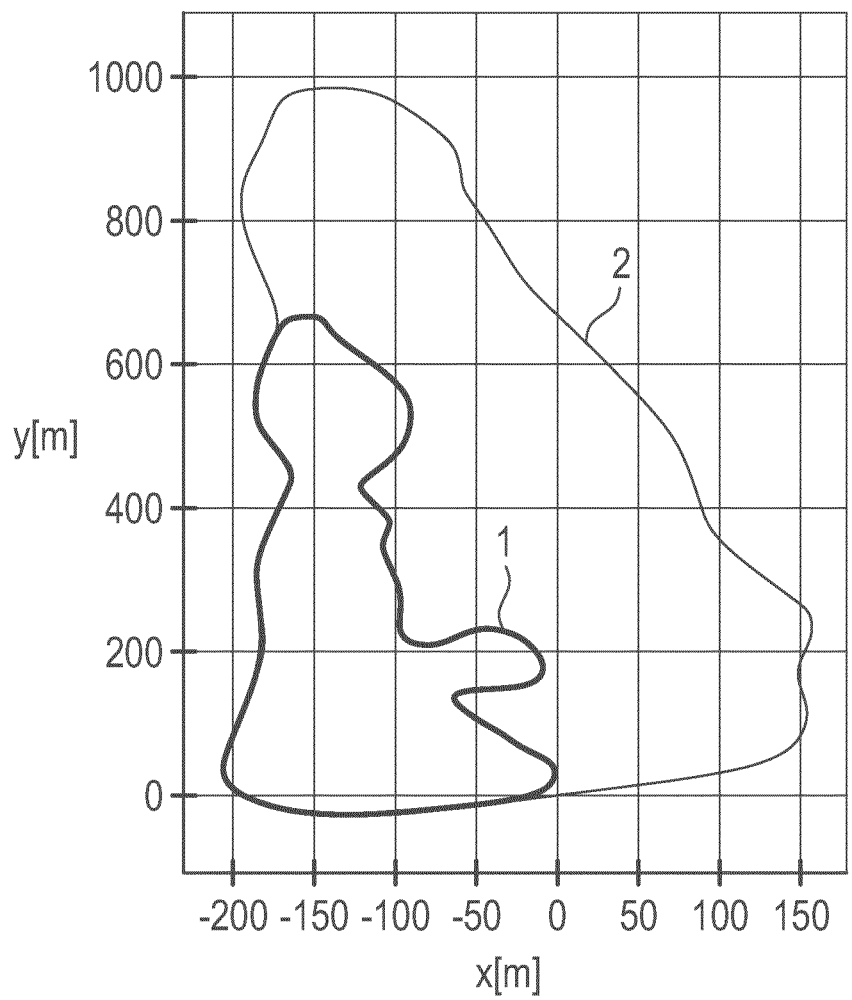
FIG. 1 illustrates a diagram of two driving routes, according to some aspects of the present disclosure.

The exemplary embodiments explained herein are preferred exemplary embodiments and examples. In the exemplary embodiments, the components described each represent individual features of the invention to be considered independently of one another, each of which also develops the invention independently of the others and all of which are therefore also to be regarded as part of the invention individually or in a combination other than that shown. Furthermore, the exemplary embodiments described can also be supplemented by further features of the invention that have already been described.

Elements with the same function are each provided with the same marks of reference in the figures.

The present disclosure aims to enable a driver and a vehicle to cope with a driving task in symbiosis. For example, the driver should be given as much freedom as possible and the assistance system should monitor the action and status space in a task-specific manner and intervene as required.

For this purpose, driver-specific properties and characteristics should be identified as precisely and situation-based as possible; these can be identified according to a given task and made available for a future assistance system.

In some examples, the geometric test data may be configured to include various data including, but not limited to, position data, a curvature, a route width, a combination of route section types (e.g., curve followed by a straight line, etc.) and/or a number of lanes of the test route. This means that the test track geometry is sufficiently available. Further information can be obtained from this geometric test data, such as the length of a straight stretch, the length of a curve, the gradient and the like. Moreover, having this test data also makes it possible to analyze the interaction of route sections. For example, a driver will drive differently into a left turn if the stretch of road ahead was a straight stretch of road or a right-hand bend. The same applies to accelerating out of a curve, when there is a straight section after a curve and not another curve. The number of lanes will also affect driving behavior. As a rule, people drive faster on a two-lane section than on a single-lane section. As a rule, all of these geometric parameters have an influence on the driving behavior of an individual driver and are primarily used for the cluster analysis.

When driving on a test route, additional situation data relating to the weather, time, traffic density and/or environment can be captured, whereby the situation data being included in the test data space and the cluster formation is included, current situation data for driving on the route to be driven are recorded and that the route sections are also assigned to the clusters depending on the current situation data. This means that not only geometry data of the test track or the test tracks can be used for the cluster formation, but also other data that can influence the driving behavior of a driver. Such situation data thus also describe the situation or the scenario, in which the forthcoming journey is embedded. The weather, in particular, can play a role if the road surface is wet or snow-covered. Moreover, the time can also play a role, and used, for example to predict traffic jams. If necessary, the traffic density can be determined, for example, by using additional information channels such as radio and the like. Furthermore, knowing the layout of the route surroundings can also be important for the driving situation. The driving behavior changes, for example, if the route is not in an open environment but in a tunnel. In addition, the situation data relating to the surroundings also include, for example, traffic signs at the edge of the road. For example, a driver in an urban area, with a maximum speed of 50 km/h, usually drives 55 km/h, while another driver in this situation usually drives exactly 50 km/h. This situation-specific individual behavior can also be taken into account here by determining the driving dynamics test data (here the speed) for the "local area" route section and using them for individual control.

Thus, the situation data may be taken into account in the test data space as separate dimensions. Special scenarios or clusters can be formed, such as "cornering on a wet road", "cornering in a rural area", "cornering on a rural road" and the like. For the transfer from the test track to the route to be traveled in future, this means that suitable up-to-date situation data is captured for driving on the route that is to be traveled. If, for example, a weather forecast or a rain sensor determines that rain is currently falling, the algorithm can access cluster elements that contain the situation "rain" or "wet road". The route sections of the route to be traveled can thereby be assigned to situation-specific clusters due to the current situation. Accordingly, the vehicle can be controlled using the driving dynamics data from these clusters.

In some examples, the driving dynamics data for several driving modes of the driver may be recorded and the test data space may be correspondingly divided into clusters, depending on the several driving modes, one of the several driving modes of which is selected for the route to be driven, and the assignment the route sections to the clusters depending on the selected driving mode. In this case, there is the possibility that the driver himself chooses his driving style, such as sport, comfort, economy, etc., and the algorithm nevertheless assists the driver individually or takes over control. To do this, it will be necessary for the driver to specify the driving mode for himself or herself as an additional parameter during the test drives, for example, if the driver wants to cover the test route in the shortest possible time, i.e., in a "sporty" way. In another case, the driver wants to drive safely or comfortably on the test track and enters this as a parameter during the test drive. In the application for a route to be traveled in the future, when the corresponding driving mode is selected, the algorithm will then divide the route sections into clusters for this specific driving mode and perform the control accordingly.

In some examples, the driving dynamics data may be configured to include a road layout, a safety distance, an acceleration, a speed and/or a jerk. This means that the driving dynamics data can include one or more parameters both for the test drive and for the control of a route to be driven currently or in the future. One of these parameters may include the course of the road, which a driver usually chooses individually when driving a stretch. However, the course of the road can also be different in various situations, even if the geometry is the same. The same applies to the safety distance to the vehicle in front. Each driver may select the right safety distance for him individually and depending on the situation. Older road users in particular maintain a greater safety distance than younger road users. This driver-specific safety distance differs again in the different situations. The other parameters such as acceleration, speed and jerk are usually very driver-specific. So, for example, each driver chooses an individual acceleration when setting off at a traffic light. The driver accepts such driver assistance all the more if it selects precisely the individual acceleration.

In some examples, the geometric data of the route to be driven and/or the current situation data may be configured to be individually weighted when assigning route sections of the route to be driven to the clusters. For example, it may be less relevant for a driver to take the time into account rather than the environment of the route currently to be traveled for the control process. In this way, it is possible to avoid too many influencing parameters from simply being averaged, as is currently the case with conventional systems which, for example, only offer "sporty" driving or the like.

In some examples, the assignment of route sections of the route to be traveled to the clusters may be based on machine learning. The machine learning can take place without monitoring. A neural network may be used as a machine learning under one example. Such a network may be trained and the test data may be used on the route sections of the route in order to classify them.

In addition, the test data space may be configured to include vehicle data about the vehicle, and that the at least one vehicle component is controlled specifically for the vehicle. This means that the driver can obtain the driving dynamics test data specifically for one vehicle. If the driver drives the same test track in a different vehicle, the driving dynamics test data can be quite different. Accordingly, it can be advantageous to also store the vehicle data and especially the vehicle type in addition to the test data. This way, the driver can use the test database for several vehicles and, for example, select a vehicle type for the current control process.

As mentioned above, the classification of drivers into categories, e.g., sporty, careful, is known from the prior art. However, this classification is very rudimentary and there is a need for a more precise, more individual representation of the driver in an assistance system.

Analyzing the driver in geometrically similar route segments is therefore recommended. Driver-specific characteristics can be derived from a difference to a planned, objectively describable trajectory, which are transferred to objectively describable categories in relation to the respective route segment.

For example, a preferred road layout, an individually selected safety distance, acceleration, speed and jerks according to the analyzed route geometry should provide a driver-specific "fingerprint" that enables local mapping and goes beyond the classification into global classes. Unknown route segments can also be evaluated with the help of route section analysis. With the help of this extrapolation, future vehicle guidance preferences can be mapped to unknown route segments and customized support can be provided.

In one embodiment, driver data is recorded in different modes (e.g., sporty, comfortable, economy, racing). Under certain circumstances, however, only a single mode is recorded and used as the data basis.

In some examples, route data and metadata (data from the area surrounding the route or the vehicle) can be stored. The data can be clustered by the route geometry (curvature), route width, reference speed, reference acceleration and the future course of the route. However, the clustering can also take place according to a selection of these parameters or also according to additional other parameters.

The driver's behavior can now be analyzed in these clusters. Parameters that describe the driving behavior or the driving style can now be derived from this in relation to the geometric segments. Unknown route data can be analyzed according to the clusters formed and the driving behavior in these segments can be predicted to obtain a support algorithm.

In this way, a driver's driving fingerprint can be created, which can be transferred to an "ADAS" (Advanced Driver Assistance System) for an individually adapted support function.

An exemplary method/process for controlling a vehicle on a route to be traveled is disclosed in connection with FIGS. 1 to 5. First, a driver drives on test track 1. In FIG. 1, test track 1 is reproduced using x- and y-coordinates in a Cartesian coordinate system.

In addition, a second route 2 is also shown in FIG. 1, which reflects the route to be traveled. The vehicle or the driver assistance system should therefore be "taught" test track 1, and on the basis of the data obtained, route 2 should be assisted or driven autonomously.

When driving test track 1, the geometric test data of test track 1 are captured. However, this geometric test data can also be captured before the test run, for example by providing the test data from a control system database.

During the test run on the test track 1, the driver's driving dynamics test data are also recorded. These driving dynamics test data characterize the driver. They represent the driver-specific fingerprint mentioned above and relate, for example, to the speeds, accelerations, safety distance and the like in relation to the geometric test data of test track 1.

Figure 2:
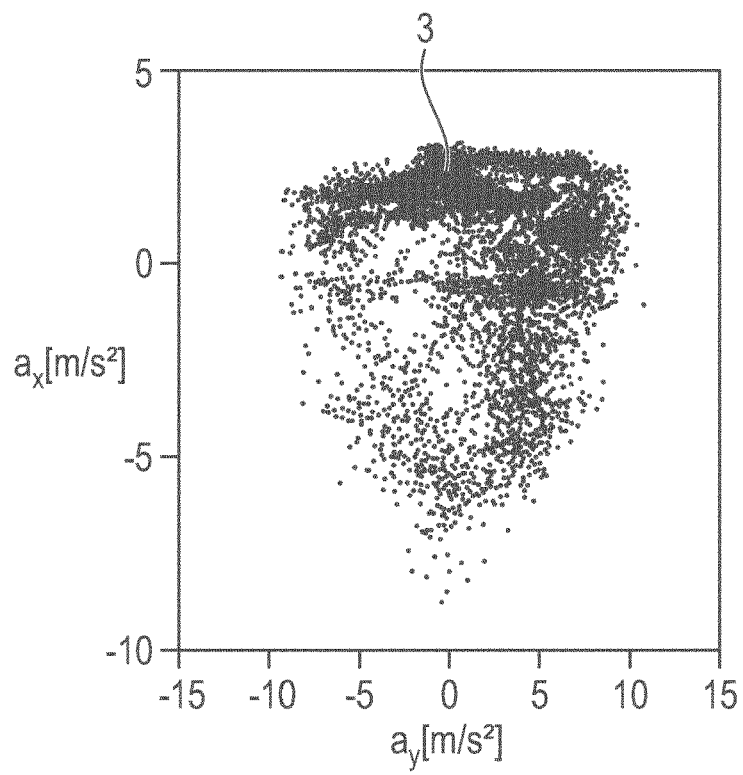
FIG. 2 illustrates an acceleration diagram for one of the two routes in FIG. 1 for a particular driver, according to some aspects of the present disclosure.
Figure 3:
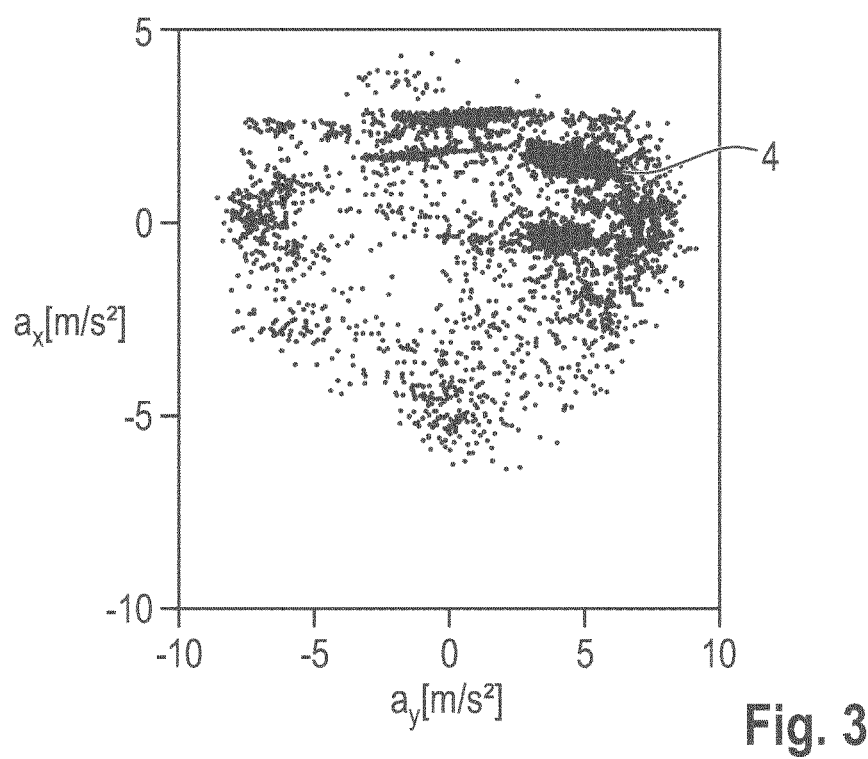
FIG. 3 illustrates an acceleration diagram of the other route in FIG. 1 for the same driver, according to some aspects of the present disclosure.
Figure 4:
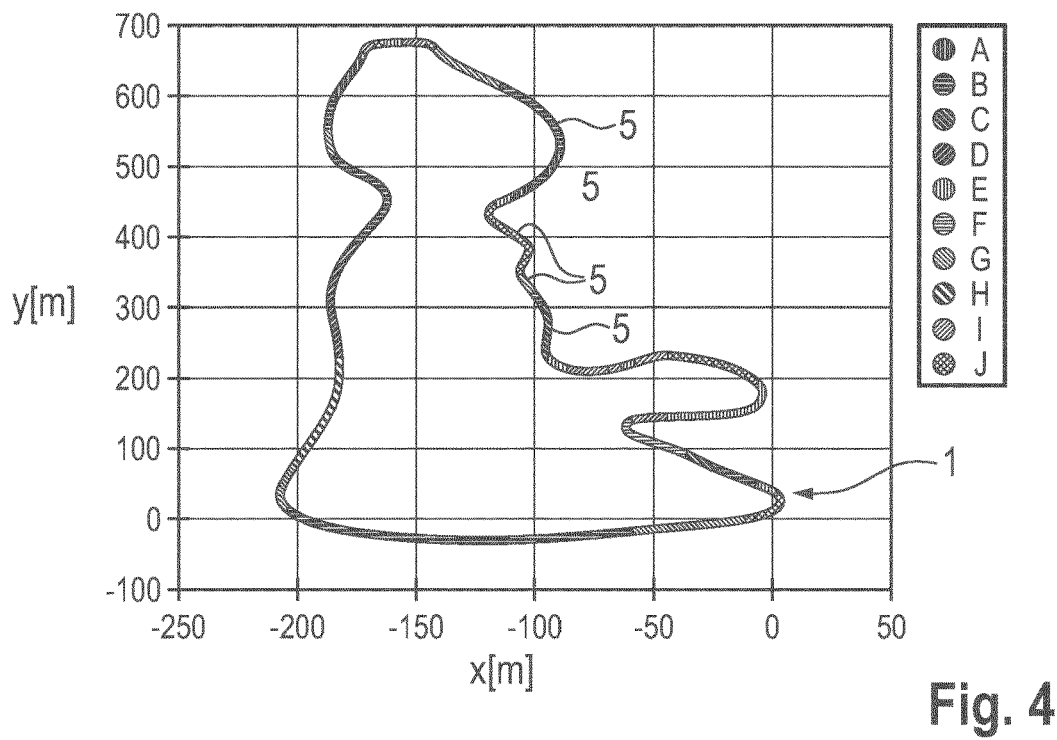
FIG. 4 illustrates one of the two routes in segmented form, according to some aspects of the present disclosure.

FIGS. 2 and 3 show acceleration diagrams that can be obtained, for example, on routes 1 and 2 with one and the same driver. Specifically, the acceleration $a_y$ in the y-direction to the right and the acceleration $a_x$ in the x-direction upwards is shown in both figures. When driving on routes 1 and 2, there are numerous acceleration measuring points, which are shown in the figures. This results in typical scatter-plots that characterize the driver's behavior with regard to acceleration. The two scatter-plots are intended to show that a two-dimensional data space can be acquired in relation to the driver behavior. In addition or as an alternative, other data as mentioned above, for example the acceleration, the width of the route and the like, can also be recorded on the routes. Accordingly, the recorded data result in a multidimensional data space or a multidimensional scatter-plot.

In the present example, this results in region 3 at the top center in FIG. 2 that includes data points occurring more frequently than the other points. These points may be around the lateral acceleration value 0 m/s². The longitudinal acceleration $a_x$ is usually slightly positive in area 3 in this example. The acceleration diagram of FIG. 2 relates to route 2 of FIG. 1. Route 2 in this example has longer straight sections and only a few curves. The driver accelerates in the straight sections, so that the longitudinal acceleration $a_x$ shows a corresponding positive value. There is a low frequency of high transverse accelerations $a_y$, since there are only a few strong curves.

The example of FIG. 3, on the other hand, shows the acceleration diagram for test track 1. Area 4 is identified in the scatter plot in FIG. 3, which in turn represents accumulated acceleration values. Said area 4 is located here in the diagram at the top right, i.e., with small positive longitudinal acceleration values and with positive transverse acceleration values. This is due to the fact that test track 1 has more curves and, because of the circuit, has more right-hand bends when it is driven clockwise. These right-hand curves result in positive transverse acceleration values $a_y$, in the diagram in FIG. 3.

It is sufficient for the process according to the present disclosure if, for example, test track 1 is driven over first for the test data. Of course, it is better if more data is generally available as a basis for the data. In principle, of course, the data from route 2 could also be used as test data. However, for the purpose of explaining the invention, the test data from test track 1 are used for track 2 to extrapolate the behavior of the driver.

For this purpose, test track 1 is first divided into segments 5. Each segment 5 represents a route section and is therefore assigned to part of the geometric test data. Each segment is assigned to one of the given clusters A to J. The entire test data space is then divided into ten different clusters A to J, for example. In principle, the number of clusters can be chosen arbitrarily. It is therefore also possible to break down the test data space to select fewer or more than ten clusters.

In this example, segmentation runs on the basis of a cluster breakdown, as was done in the multi-dimensional test data space (without vehicle dynamics data). This scatterplot can be visualized as shown in FIGS. 2 and 3, but with correspondingly more dimensions. Each point on the test track is assigned to one of the clusters A to J. This results in a large number of connected groups of points on the route, each of which is assigned to one of the clusters. Geometrically, each group of points represents a segment of this test track 1.

For example, all points on a straight stretch before a sharp bend are assigned to cluster A. This section of the route thus forms segment 5.

Next, driving dynamics data should be defined to correspond to a cluster. For this purpose, for example, the driving dynamics data of the points of the cluster can be averaged. However, for example, a median value of the respective parameter (e.g., speed or acceleration) for the cluster could also be chosen as a fixed value.

The breakdown into clusters results in segments on the route that are geometrically similar and are driven in a similar way in terms of driving dynamics. These formed clusters can now be used to classify and assign unknown route segments. The results of the test track driving analysis can then be transferred to the assistance system. The analysis of the test track can thus be transferred to the route 2 to be driven.

Figure 5:
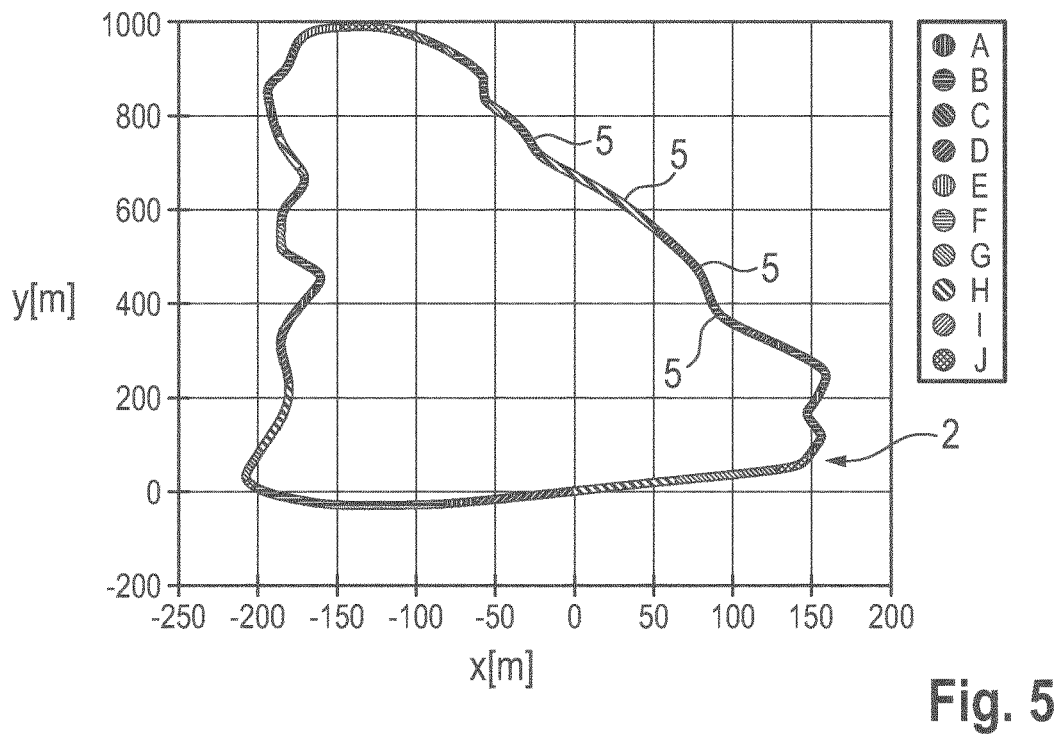
FIG. 5 illustrates the other of the two routes in segmented form, according to some aspects of the present disclosure.

The geometric data of the route 2, to be newly driven, are known. If necessary, they are determined via a navigation system or the like. Based on this geometric data, clustering into segments can take place. The clusters that were generated in advance in the test data room are used for this purpose. Based on the clustering, the results for route 2 to be driven, the segments 5 are obtained as shown in FIG. 5. The segmentation of the route segments in route 2 to be driven is thus similar to the test route 1. Each segment 5 stands for a specific scenario, e.g., longer straight stretch, heading for a curve, initial speed 50 km/h, braking acceleration −2 m/s$^2$ etc. When driving on route 2, the driver assistance system can then, for example, specify the speed and acceleration values that are specified for the associated clusters in the respective segment.

A segment-based analysis offers the possibility of subdividing the driver or his identification into subsets. In principle, more aspects can be implemented in the description at this point or the parameters can be weighted differently. In other words, according to the selected category, such as a comfortable or sporty drive, individual driver-specific characteristics can be mapped (such as the road layout in a scenario that is difficult to see, safety margin and route width, etc.), which are not averaged for each route, but are evaluated individually for the one described scenario. As a result, more natural support for the driver can be achieved, which is perceived as less of an imposition of the defined response behavior by experts. In this way, comprehensible support can be achieved with a high degree of acceptance by the driver.

According to a further embodiment, specific modes for the driving dynamics support (such as sporty, comfort, economy, etc.) can be provided in combination with the classification of the driver's ability (e.g., sporty, careful).

According to the present disclosure, the exemplary embodiments have the advantage of extracting features that describe the driver behavior based on scenarios in a targeted manner and implementing them in an individualized assistance system. This leads to higher acceptance of the driving dynamics support. Furthermore, the function could be offered as an additional feature to an existing function, thereby adding value to the product without significant additional costs.

LIST OF REFERENCE SIGNS

1 Test track
2 Route
3 Area
4 Area
5 Segment

The invention claimed is:

1. A method for controlling a vehicle on a route to be driven, comprising:
    obtaining driving dynamic test data from a test track;
    obtaining geometric test data of the test track;
    dividing a test data space formed by the geometric test data into clusters;
    defining driving dynamic data for each cluster based on the driving dynamic test data that can be assigned to a respective cluster;
    assigning sections of a route to be traveled to the clusters, based on a geometric data of the route to be traveled, and
    controlling at least one vehicle component of the vehicle in one of the sections according to the defined driving dynamic data of the respective cluster.

2. The method of claim 1, wherein the geometric test data include position data, curvature, road width, a combination of road segment types, and/or a number of lanes of the test track.

3. The method of claim 1, further comprising obtaining additional situation data regarding weather, time, traffic density, and/or surroundings, wherein the situation data are incorporated into the test data space and the clustering process.

4. The method of claim 3, further comprising obtaining current situation data for traveling on the route to be traveled, wherein the current situation data is used for the assigning sections of a route to be traveled to the clusters.

5. The method of claim 4, further comprising individually weighting the geometric data of the route to be traveled and/or the current situation data when assigning route segments of the route to be traveled to the clusters.

6. The method of claim 1, further comprising obtaining driving dynamic data for multiple driver modes, wherein the defining of the driving dynamic data is based on the multiple driver modes for the route to be traveled.

7. The method of claim 6, further comprising receiving a selection of one of the multiple driver modes, wherein the assigning sections of a route to be traveled to the clusters is done depending on the selected driving mode.

8. The method of claim 1, wherein the driving dynamic data include a lane guidance, a safety distance, an acceleration, a speed, and/or a jerk.

9. The method of claim 1, wherein the assigning of route segments of the route to be traveled to the clusters is based on machine learning.

10. The method of claim 1, wherein the test data space comprises vehicle data about vehicle characteristics, and the controlling of the at least one vehicle component is specific to the vehicle characteristics.

11. A driver assistance system for controlling a vehicle on a route to be traveled, comprising:
a memory for storing sensor-based geometric test data of a test track and sensor-based driving dynamics test data the test track;
one or more hardware processors operably coupled to the memory and configured to execute a clustering algorithm that partitions a test data space formed by the geometric test data into clusters, the hardware processors further configured to determine, for each cluster, driving dynamics data based on the driving dynamics test data assigned to that cluster, and configured to assign route segments of the route to be traveled to the clusters based on geometric data of the route to be traveled; and
an electronic control unit (ECU) comprising the hardware processors and actuator/driver interfaces, configured to control at least one vehicle component of the vehicle in one of the route segments according to the determined driving dynamic data of a respective cluster.

12. The driver assistance system of claim 11, wherein the geometric test data include position data, curvature, road width, a combination of road segment types, and/or a number of lanes of the test track.

13. The driver assistance system of claim 11, wherein the hardware processors are configured to obtain additional situation data regarding weather, time, traffic density, and/or surroundings, and to incorporate the situation data into the test data space and the clustering process.

14. The driver assistance system of claim 13, wherein the hardware processors are configured to obtain current situation data for traveling on the route to be traveled, wherein the current situation data is used for the assigning sections of a route to be traveled to the clusters.

15. The driver assistance system of claim 14, wherein the hardware processors are configured to individually weight the geometric data of the route to be traveled and/or the current situation data when assigning route segments of the route to be traveled to the clusters.

16. The driver assistance system of claim 11, wherein the hardware processors are configured to obtain driving dynamic data for multiple driver modes, wherein the determined driving dynamic data is based on the multiple driver modes for the route to be traveled.

17. The driver assistance system of claim 16, wherein the hardware processors are configured to receive a selection of one of the multiple driver modes, wherein the data processing device is further configured to assign sections of a route to be traveled to the clusters depending on the selected driving mode.

18. The driver assistance system of claim 11, wherein the driving dynamic data comprises a lane guidance, a safety distance, an acceleration, a speed, and/or a jerk.

19. The driver assistance system of claim 11, wherein the hardware processors are configured to assign route segments of the route to be traveled to the clusters based on machine learning.

20. The driver assistance system of claim 11, wherein the test data space comprises vehicle data about vehicle characteristics, and the controlling of the at least one vehicle component is specific to the vehicle characteristics.

* * * * *